(12) United States Patent
Baughman et al.

(10) Patent No.: US 10,586,159 B2
(45) Date of Patent: *Mar. 10, 2020

(54) MOOD DETECTION WITH INTELLIGENCE AGENTS

(71) Applicant: International Business Machines Corporation, Armonk, NY (US)

(72) Inventors: Aaron K. Baughman, Silver Spring, MD (US); Diwesh Pandey, Bangalore (IN); John P. Perrino, Hedgesville, WV (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,326

(22) Filed: Apr. 12, 2019

(65) Prior Publication Data
US 2019/0236467 A1    Aug. 1, 2019

Related U.S. Application Data

(63) Continuation of application No. 15/604,908, filed on May 25, 2017, now Pat. No. 10,318,876.

(51) Int. Cl.
*G06N 5/04* (2006.01)
*G06N 3/00* (2006.01)
*G06N 5/02* (2006.01)

(52) U.S. Cl.
CPC ............ *G06N 5/043* (2013.01); *G06N 3/006* (2013.01); *G06N 5/022* (2013.01)

(58) Field of Classification Search
None
See application file for complete search history.

(56) References Cited

U.S. PATENT DOCUMENTS

| 8,565,922 | B2 | 10/2013 | Kidd |
| 8,621,416 | B1 | 12/2013 | Thomas |
| 8,838,505 | B2 | 9/2014 | Jang et al. |
| 8,965,828 | B2 | 2/2015 | Greenzeiger et al. |
| 9,098,109 | B2 | 8/2015 | Lappalainen et al. |
| 9,160,773 | B2 | 10/2015 | Bill |
| 9,277,375 | B2 | 3/2016 | Uusitalo et al. |
| 10,223,641 | B2 * | 3/2019 | Baughman ............ G06N 5/043 |
| 2014/0288704 | A1 | 9/2014 | Baurmann |
| 2015/0086949 | A1 | 3/2015 | Li |

(Continued)

OTHER PUBLICATIONS

Appendix P—List of IBM Patents or Patent Applications Treated as Related, Filed herewith, 2 Pages.
Baughman et al., "Mood Detection With Intelligence Agents", U.S. Appl. No. 16/382,367, filed Apr. 12, 2019.

(Continued)

*Primary Examiner* — Alan Chen
(74) *Attorney, Agent, or Firm* — Stephanie L. Carusillo

(57) ABSTRACT

Embodiments of the present invention provide a computer program product for increasing the quality of interactions between two or more entities. These entities are either individuals (e.g., human beings using a computer device) or artificial intelligence (AI) agents. The interactions between all of the entities within a computing environment are mapped and analyzed. Based on the mapped interactions, a relationship model is generated in order to run multiple applications within a computing environment.

1 Claim, 4 Drawing Sheets

(56) References Cited

U.S. PATENT DOCUMENTS

| | | |
|---|---|---|
| 2015/0189085 A1 | 7/2015 | Riahi |
| 2016/0117593 A1 | 4/2016 | London |
| 2016/0162474 A1 | 6/2016 | Agarwal |
| 2016/0300570 A1 | 10/2016 | Gustafson |
| 2017/0228520 A1 | 8/2017 | Kidd |
| 2018/0075205 A1 | 3/2018 | Moturu |
| 2018/0196796 A1 | 7/2018 | Wu |
| 2018/0341868 A1 | 11/2018 | Baughman |

OTHER PUBLICATIONS

Han et al. "Robotic Emotional Expression Generation Based on Mood Transition and Personality Model", IEEE Transactions on Cybernetics, vol. 43, No. 4, Aug. 2013, Digital Object Identifier 10.1109/TSMCB.2012.2228851, 2168-2267 © 2012 IEEE, pp. 1290-1303.
Hudlicka et al. "Social interaction with robots and agents: Where do we stand, Where do we go?", 7 pages, <http://ieeexplore.ieee.org/ielx5/5342220/5349257/05349472.pdf?tp=&arnumber=5349472&isnumber=5349257>, Printed May 24, 2017.
Lu et al., "Computing and Applying Topic-level User Interactions in Microblog Recommendation", SIGIR'14, Jul. 6-11, 2014, Gold Coast, Queensland, Australia, Copyright 2014 ACM 978-1-4503-2257-7/14/07, pp. 843-846.
Sanchez et al., "Towards mood-oriented interfaces for synchronous interaction" CLIHC'05, Oct. 23-26, 2005, Cuernavaca, Mexico. Copyright is held by the author(s). ACM 1-59593-224-0, pp. 1-7.
Xu et al. "Mood Expression through Parameterized Functional Behavior of Robots", Final draft version, accepted by RO-MAN 2013, 8 pages.

\* cited by examiner

MOOD DETECTION WITH INTELLIGENCE AGENTS

BACKGROUND

The present invention relates generally to the field of computing technology, and more particularly to managing artificial intelligence (AI) systems.

Artificial intelligence (AI) represents intelligence exhibited by machines (i.e., a tool or device which uses energy to perform a task). AI agents are autonomous entities which contain sensors and actuators that perform percept and action operations, respectively. A percept operation refers to an AI agent observing an environment connected to (i.e., directly interacting with) the AI agent. An action operation refers to an AI agent acting/reacting to an environment connected (i.e., directly interacting with) to the AI agent. Living organisms (e.g., humans), computer systems, and biological systems may reside within an environment that facilitates interactions with the AI agent. As AI becomes more prevalent in machines and devices, human beings will increasingly interact with AI agents.

SUMMARY

According to one embodiment of the present invention, a computer program product for enhancing interactions between artificial intelligence agents and human beings is provided. The computer program product comprises: observing, by one or more processors, interactions between entities contained within an environment; creating, by one or more processors, a cognitive profile for each respective entity within the environment; mapping, by one or more processors, a set of interactions to each cognitive profile for each respective entity based on the observed interactions; and generating, by one or more processors, solutions for each respective entity within the environment based on the created cognitive profile and the mapped set of interactions for each respective entity.

DETAILED DESCRIPTION

Figure 1:
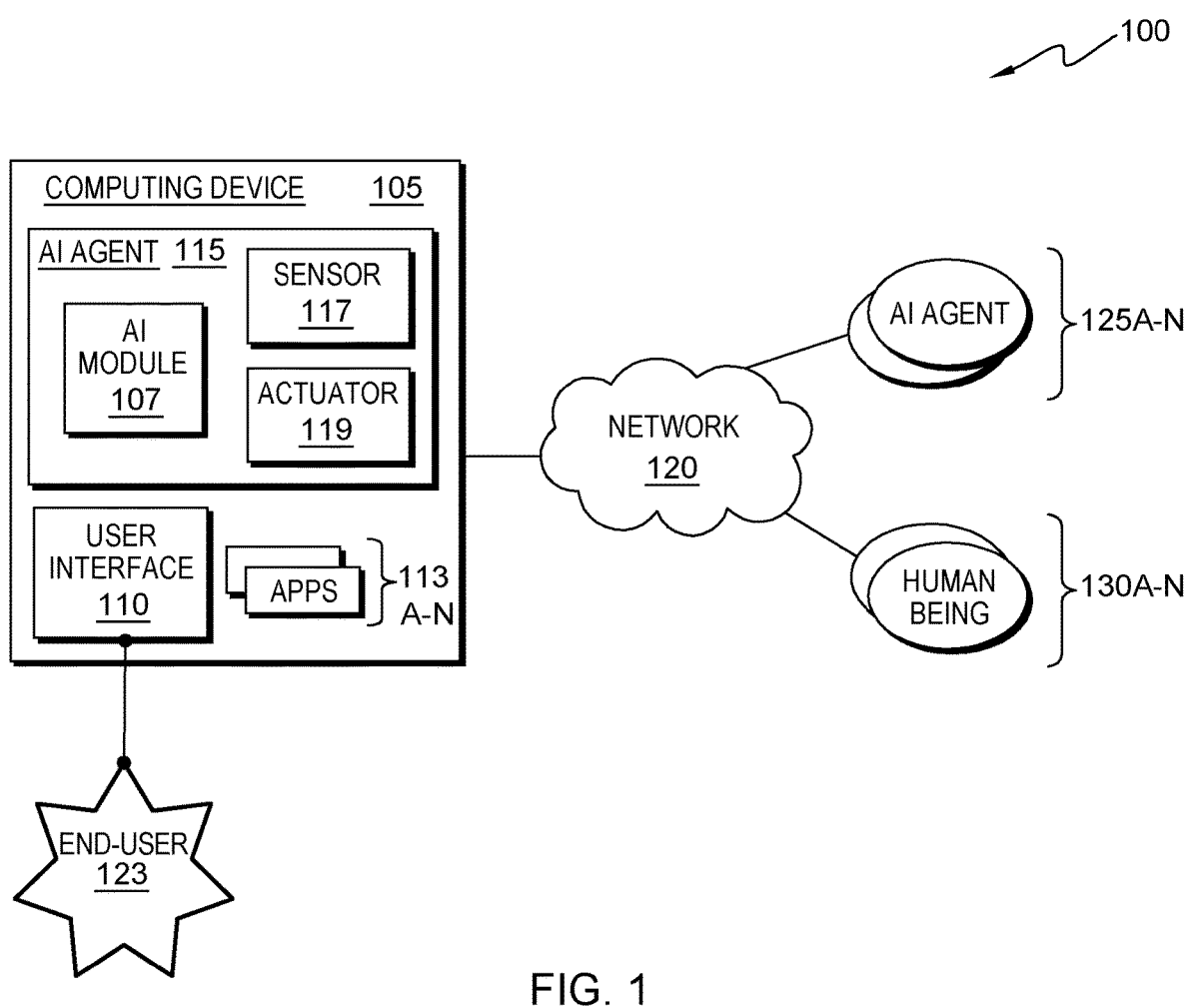
FIG. 1 is a functional block diagram illustrating a data processing environment, in accordance with an embodiment of the present invention.

AI agents are behaving as intelligent agents which exhibit cognitive abilities, such as intelligence. For the purpose of this disclosure, intelligence agents are: (i) synonymous with intelligent agents; and (ii) referring to individuals (e.g., human beings) and AI agents within an environment of interest. An individual's mood varies based on time, location, and interactions with other entities throughout the day. These entities include: (i) other individuals (e.g., family, friends, and office colleagues) and (ii) AI agents. Often, individuals exhibit warm and happy emotions (i.e., positive emotions) towards other individuals while exhibiting tired or more negative emotions towards other individuals. The quality of communication or performance of a task in a group of individuals depends on how positive or negative the relationship is among the group of individuals.

In the world of computer-human interface, an individual needs to discern the behavior between a plurality of AI agents. Embodiments of the present invention recognize that users need to discern behavior from one AI agent and that AI agent's unique qualities from a different AI agent. In some instances, a user may need to discern relationships between multiple AI agents. For example, user 1 may need to discern the relationship between user 2 and user 2's relationship with an AI agent. Differentiating between respective AI agents and context with which their interactions take place can aid in the understanding of these different interactions. For example, understanding the context of these interactions can aid in differentiating an AI agent (i.e., an entity that is not a human being) from an individual (i.e., an entity who is a human being). In this embodiment, different types of relationships between AI agents and individuals are recognized and used to construct relationship models. Examples of relationship types include: (i) human-to-human interactions among different individuals; and (ii) computer-to-human interactions among AI Agent(s) and individual(s), there are computer-to-computer interactions among different AI Agents.

Since AI Agents are always learning with online learning strategies, ensuring that the correct content and language models are being used is important. Embodiments of the present invention disclose methods and systems to better ensure correct content and language models are being used by: (i) creating a multi-way interaction profile of an individual with other individuals and AI agents with whom he/she interacts over a constant interval of time; (ii) extracting the multi-way interaction profile for different instances of place and time; (iii) creating specific events and scheduling events based on an individual's multi-way interaction profile or an AI agent's multi-way interaction profile; (iv) sharing a relationship profile between two entities (e.g., two individuals or an individual and AI agent or two AI agents) with another entity (e.g. another individual or another AI agent); and (v) bolstering relationships between two or more entities based on the multi-way interaction profiles and the relationship profiles.

One embodiment of the present invention can observe, identify, and classify interactions between the entities. For example, embodiments of the present invention can identify that AI agent1 has a pleasant interaction while AI agent2 has an unpleasant interaction with each other. Embodiments of the present invention can then use this interaction to create respective cognitive profiles for the AI agents it observed. A "cognitive profile" as used herein, refers to a collection of observed interactions along with respectively analyzed, identified, and classified interactions between one or more entities. A cognitive profile may include a relationship model that classifies relationships between entities. A cognitive profile may also include a multi-way interaction profile that shows how respective entities are related and what interactions each respective entity has in relation to another respective entity. An "entity" as used herein, refers to an AI agent, user using a computing device (e.g., individuals), or any number of combination of AI agents and users. In this manner, as described in greater detail later in this specification, embodiments of the present invention provide solutions for leveraging cognitive profiles (e.g., multi-way interaction profile and relationship profile) to identify outcomes of potential interactions.

Embodiments of the present invention further provide solutions for ameliorating interactions between entities having a cognitive profile. For example, embodiments of the present invention can identify that entity A has unpleasant interactions with entity B. In those instances, embodiments of the present invention can leverage the cognitive profile that provides the information regarding entity A and entity B's interactions and suggest one or more actions to ameliorate interactions between entity A and B. An example of an "action" suggested can be changing the color of garments of entity A which in turn makes the mood of individual B warmer. Other examples can include rotating or changing colors worn based cognitive profiles of respective individuals, and/or mixing color gradients. Stated another way, embodiments of the present invention can assist in filling in the relationship gap based on the multi-way interaction profile and the relationship profile (e.g., cognitive profile) data among entities.

In yet other embodiments, embodiments of the present invention can deploy tangible implementations based on respective cognitive profiles. For example, embodiments of the present invention can deploy robotic entities that offer positive affirmations to a user. In another example, embodiments of the present invention can leverage solutions for purchasing items that may ameliorate the mood of a user based on the user's cognitive profile. For example, in some instances, embodiments of the present invention can purchase flowers for a user based on the user's cognitive profile.

The present invention will now be described in detail by referencing the Figures. FIG. 1 is a functional block diagram illustrating a computing environment, generally designated 100, in accordance with one embodiment of the present invention. FIG. 1 provides only an illustration of implementation and does not imply any limitations regarding the environments in which different embodiments may be implemented. Modifications to data processing environment 100 may be made by those skilled in the art without departing from the scope of the invention as recited by the claims. In this exemplary embodiment, data processing environment 100 includes computing device 105, AI agents 125A-N, and human beings 130A-N, which are all connected via network 120. Data processing environment 100 contains all of the entities within a system of interest to AI module 107, wherein an entity can be an individual and an AI agent.

Computing device 105 can be a desktop computer, laptop computer, specialized computer server, or any other computer system known in the art. In certain embodiments, computing device 105 represents computer systems utilizing clustered computers and components to act as a single pool of seamless resources when accessed through network 120. For example, such embodiments may be used in data center, cloud computing, storage area network (SAN), and in network attached storage (NAS) applications. In certain embodiments, computing device 105 represents virtual machines. In general, computing device 105 is representative of any electronic devices, or combination of electronic devices, capable of executing machine-readable program instructions, as described in greater detail with regard to FIG. 4.

Computing device 105 provides an interface for entities to interact with or otherwise communicate with one or more other entities (e.g., AI agents and/or other end users). For example, user interface 110 is capable of receiving data, user commands, and data input modifications from an end-user and communicating with AI agent 115, apps 113A-N, AI agents 125A-N, and human beings 130A-N. In this embodiment, computing device 105 includes user interface 110, applications (apps) 113A-N, and AI agent 115.

User interface 110 may be, for example, a graphical user interface (GUI) or a web user interface (WUI) and can display text, documents, web browser windows, user options, application interfaces, instructions for operation, and includes the information (such as graphics, text, and sound) presented to a user and control sequences that entities such as end-users employ to control programs, such as apps 113A-N.

In an exemplary embodiment, apps 113A-N are software programs which perform a specific task when executed by a computer, such as computing device 105. In an exemplary embodiment, apps 113A-N represent e-commerce mobile applications for stock trading with a built-in customer service functionality.

AI agent 115 interfaces with other entities (e.g., individuals using a computing device or other AI agents) and manages respective capabilities of the AI agent. In this embodiment, capabilities of AI agent 115 include constructing cognitive profiles, inferring relationships between entities having cognitive profiles, suggesting solutions for ameliorating interactions between entities, and deploying tangible implementations that solve problems associated with interactions based on respective cognitive profiles. In an exemplary embodiment, AI agent 115 is using computing device 105 to interact with AI agents 125A-N and human beings 130A-N. AI agent 115 may be a robot or a more conventional AI agent, which learns new features from another robot or AI agent (e.g., AI agents 125A-N). AI agent 115 includes AI module 107, sensor 117 and actuator 119.

AI module 107 constructs cognitive profiles (e.g., multi-way interaction profile) of AI agent 115 and any other entity that AI agent 115 interacts with. For example, AI module 107 can construct cognitive profiles for itself (e.g., end-user 123 or AI agent 115) as well as a cognitive profile for AI agent 125A and AI agent 125B, among AI agents 125A-N. AI module 107 can also construct cognitive profiles for interactions that AI module 107 observes. For example, AI module 107 can observe an interaction between AI agent 125A and AI agent 125B and create a cognitive profile for the interaction between the two AI agents. In another instance, AI module 107 can construct a cognitive profile for itself and the end user using computing device 105 and make the constructed cognitive profile accessible to the end user via user interface 110.

For illustrative purposes, AI module 107 is an embedded software program or software application in AI agent 115. However, it should be understood that AI module 107 can be embedded in other AI agents or other computing devices not shown. In this embodiment, AI module 107 constructs a cognitive profile by: (i) performing mood analysis; and (ii) noting behavioral tendencies among all entities—individuals (e.g., the end-user of computing device 105 and human beings 130A-N) and AI agents (AI agent 115 and AI agent 125A-N) within a system of interest to AI module 107. End-user 123 is an individual using computing device 105. These behavioral tendencies are described in more detail with respect to FIG. 2.

In this embodiment, AI module 107 infers the relationship among the different entities by performing mood analysis. A mood analysis is based on interactions of one entity with other entities for different times and place instances. In an exemplary embodiment, a mood analysis is done on all the interactions for all entities (e.g., among the end user, human beings 130A-N, and AI agents 125A-N) in order to construct a cognitive profile (e.g., multi-way interaction profile) for end-user 123 to view. In another exemplary embodiment, a mood analysis is done on the interactions among AI agent 115, human beings 130A-N, and AI agents 125A-N for AI agent 115 for further analysis. The cognitive profiles record the different interactions among the all of the entities within a system of interest, which may be stored on computing device 105 via AI module 107; displayed on user interface 110 to end-user 123 via AI module 107; and processed by AI agent 115 via AI module 107. In some embodiments, mood analysis, as performed by AI module 107, involves measuring positive and negative sentiments of an interaction; noting behavioral triggers which lead to changes in the behavior of an individual or AI agents; and interpreting facial expressions. For example, end-user 123 becomes very intense when discussing securities that traded within his Roth IRA account on an e-commerce stock trading platform. On the e-commerce stock trading platform, individuals and AI agents interact with each, the individuals are looking for investment advice through queries and the AI agents provide answers to the queries from the individuals. However, other individuals can also answer queries, wherein the other individuals are customer help agents also using the e-commerce stocking trading platform. In this example, end-user 123 becomes impatient when AI agents answer his queries yet calm and understanding when other individuals answer his queries. End-user 123 finds AI agents to be robotic, terse, and unemotional. However, if there are other individuals responding to his query in a curt fashion, such as not addressing end-user 123 by his name, then end-user 123 becomes enraged with those other individuals. End-user 123 exhibits far more negative sentiments when "enraged" as opposed to "impatient" by assertively expressing displeasure with those other individuals and making mildly sarcastic remarks to the AI agents, respectively. AI module 107 recognizes nuances in interactions. From this example, AI module 107 finds that end-user 123 exhibits the following: (a) reacting negatively to robotic and impersonal communication; and (b) reacting even more negatively to impersonal communications from a human (e.g., the other individuals) than robotic communication from a machine (e.g., the AI agents). Furthermore, AI module 107 incorporates these findings into the cognitive profile of end-user 123, as recognized and analyzed by AI module 107.

AI module 107 can then utilize the performed mood analysis on the observed interactions between the entities. In this embodiment, AI module 107 maps the observed entities and their respective interactions as discrete data objects within each respective cognitive profile (e.g., the multi-way interaction profile).

AI module 107 further refines the constructive cognitive profile by constructing a relationship model. In an exemplary embodiment, AI module 107 constructs a relationship model for the cognitive profile to contextual the interactions between the entities. In this embodiment, AI module 107 examines colors in order to ascertain which colors may make the respective entity feel better. For example, AI module 107 may examine several different colors for individual B's cognitive profile. In this example, AI module 107 has determined through the use of social media and other data driven forms that individual B is predisposed to liking the color green with a certain degree of confidence. Based on questionnaires and social media accounts, individual B rates videos and pictures with a large amount of green content more favorably than those videos and pictures lacking a large amount of green content. Frequently, individual B gives videos and picture with a large amount of green content with a "thumbs up" rating and writes in the "Comments"-section that "green symbolizes beauty like no other expression." In response to AI module 107 analyzing individual B's interactions and behavior, AI module 107 determines that individual has a preference for a certain color—green. Because individual B has a preference for a certain color, AI module 107 is able to identify color preferences as a secondary attribute while constructing the relationship model for the cognitive profile for individual B.

In this embodiment, the relationship model built for the cognitive profile includes a list of interests of an individual or an AI agent. In this embodiment, AI module 107 can access a user's social media profiles, accessible data driven forms (e.g., questionnaires), and media otherwise publicly made available (e.g., audio, video, picture, etc.) to compile a list of preferences for the user's cognitive profile. For example, AI module 107 can access a user's social media and determine that the user likes the sport, tennis. In another example, AI module 107 can access a user's calendar and analyze, for a given time period, that the user has schedule 50 meetings over the past month, all in the morning. AI module 107 can then infer that the user has a preference for scheduling meetings in the morning.

AI module 107 can then deploy appropriate suggestions based on contextual information given. For example, where AI module 107 has been tasked with scheduling a meeting, AI module 107 can recommend that end-user 123 (via user interface 110) or transmit a suggestion to AI agent 115 create and schedule specific events in the morning. In another example, AI module 107 can alter meeting plans and types based on the user's cognitive profile. For example, AI module 107 can determine that the user prefers to have in person meetings with human being 130A while the end user prefers discussing meetings over the phone with human being 130B.

In this embodiment, AI module 107 provides the capability to share the constructed cognitive profile. In this embodiment, the end user may transmit a command to AI module 107 to share the cognitive profile that includes the relationship model with a different end user or AI agent. In other embodiments, AI agent 115 can access the constructed cognitive profile and share the constructed profile with one or more other components of data processing environment 100. Accordingly, by constructing the cognitive profile and making the cognitive profile available for viewing between one or more other entities, new conversations and interactions between entities can be made easier.

AI module 107 further processes the cognitive profile, multi-way interaction profile, and relationship model based on instances of place and time in order to: (i) control and monitor dialogues among the entities to assist end-user 123 and AI agent 115 to facilitate constructive dialogue in a multi-individual or multi-AI agent chat; (ii) create and schedule specific events based on instances of place and time; (iii) share relationship profiles from the relationship model with other entities; and (iv) utilize relationship assisting models via garment color change and pleasant robots, as described in greater detail with regard to FIG. 2.

Sensor 117 represents sensors and actuator 119 represents actuators that perform percept and action operations, respectively. For example, sensor 117 and actuator 119 can perform precept and action operations with regards to one or more entities (e.g., any number and combination of AI agents and end users using computing device 105).

An "action operation" as used herein, refers to one or more operations that can be performed to affect an end user.

For example, an action can include suggestions (e.g., strategies to approach a specific end user, colors to wear to calm an end user, etc.). An action can also include a set of transmitted instructions (e.g., deploying mood enhancing robots) or any other process that performs with the desired function to achieve ameliorating an interaction (e.g., ordering flowers for an end user based on the end user's cognitive profile and received contextual information).

A "precept operation" as used herein, refers to one or more operations used to observe entities. For example, a precept operation can be to observe an entity to identify moods and emotions. Another precept operation can be to process and analyze an entity's social media to determine preference.

Within an environment containing AI agent 115, action operations are actions/events performed against the environment by AI agent 115 while percept operations are actions/events perceived from the environment by AI agent 115. Even though not depicted explicitly in AI agents 125A-N, components which are the same as or functionally similar to sensor 117 and actuator 119 reside within AI agents 125A-N. Special tests, which are described in more detail with respect to FIG. 2, aid in contrasting a cognitive profile for AI agents 125A-N and AI agent 115.

In this embodiment, AI agents 125A-N represent artificial intelligence based entities which aid an end-user looking for customer service assistance. In contrast, human beings 130A-N represent individuals using computing devices (e.g., computing device 105) to communicate with one or more other human beings and/or AI agents (e.g., one or more other AI agents 125A-N). Stated another way, AI agents 125A-N (and AI agent 115) are artificial intelligence-based entities, whereas human beings 130A-N and end-user are not artificial intelligence-based entities. For illustrative purposes, AI Agents 125A-N are one or more AI agents which may or may not be different from each other. Human beings 130A-N are one or more individuals on computing devices which may or may not be different each other.

Network 120 may be, for example, a local area network (LAN), a wide area network (WAN) such as the Internet, or a combination of the two, and may include wired, wireless, or fiber optic connections. In general, network 120 can be any combination of connections and protocols that will support communication between computing device 105, AI agents 125A-N, and human beings 130A-N.

Figure 2:
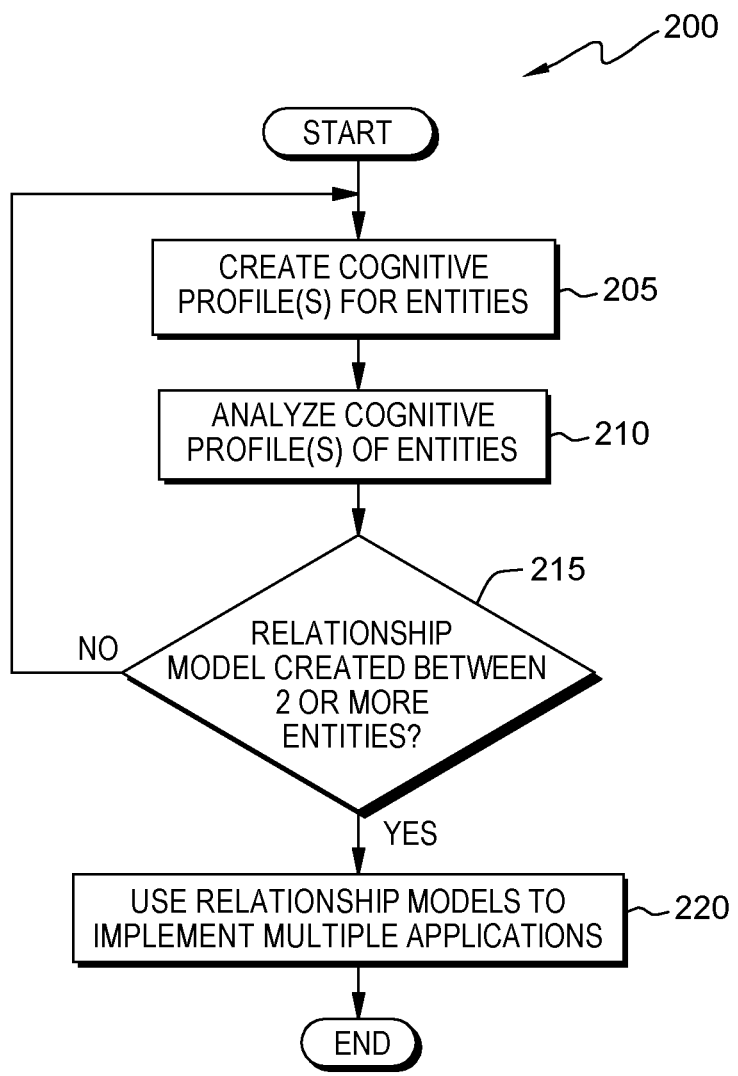
FIG. 2 is a flowchart depicting the operational steps performed by an AI module, in accordance with an embodiment of the present invention.

FIG. 2 is a flowchart 200 depicting the operational steps performed by an AI module, in accordance with an embodiment of the present invention.

Flowchart 200 are the operational steps performed by AI module 107.

In step 205, AI module 107 creates cognitive profile(s) for the (one or more) entities (within data processing environment 100). As mentioned before, an "entity" as used herein, refers to an AI agent, user using a computing device, or any number of combination of AI agents and users (e.g., individuals such as end-user 123 and human beings 130A-N; and AI agents such as AI agent 115 and AI agents 125A-N). In an exemplary embodiment, AI module 107 utilizes biometrics (e.g., fingerprints, palm veins, DNA, palm prints, iris recognition, retina, etc.) and observation protocols to create cognitive profiles. Examples of observation protocols may include monitoring the tone of conversation among different entities, and monitoring facial expressions using facial recognition methods are used to create the cognitive profiles for end-user 123 and human beings 130A-N.

For example, AI module 107 can create a cognitive profile for end-user 123 using end-user 123's biometrics, social media accounts, and other publicly made information. In this instance, AI module 107 has observed end-user 123's behavior with end-user 123's social interactions and has identified two types of relationships: social acquaintances and business relationships. AI module 107 has further utilized end-user 123's biometric data to identify end-user 123's emotions and can identify certain triggers for emotions (e.g., losing money triggers anger). In this example, the biometric data, as observed and processed by AI module 107, is included and/or incorporated into the cognitive profile for end-user 123. Continuing the example, AI module 107 has observed interactions with end-user 123 another user, (e.g., end-user 123's broker), and other AI agents (AI agents 125A-N). AI module 107 has determined based on observations that end-user 123 gets irritated when interacting with AI agents 125A-N while using apps 113A-N. In this example, apps 113A-N are used for stock trading and also have a customer service functionality through a brokerage firm. In this example, the user turns to AI agents 125A-N for further help. In this instance, AI agents 125A-N attends to the concerns of end-user 123. In this example, end-user 123 is concerned about an unprocessed transfer of funds into end-user 123's brokerage account and wants a further elaboration of investor terms such as "call options" and "leveraged funds". End-user 123 begins interacting with AI agents 125A-N. AI module 107 performs precept operations and identifies based on observations that end-user 123 has become annoyed at AI agents 125A-N. Specifically, AI module 107 identifies that end-user 123 finds AI agents 125A-N to be slow, robotic (i.e., lacking human emotion), and ineffective at elaborating what "call options" are.

AI module 107 can then identify that end-user 123 would prefer to deal with an actual human being. The operations observed and performed by AI module 107 are recorded and this type of information, that is, the 1) interaction between end-user 123 and apps 113A-N, 2) the interaction between the end user and AI agents 125A-N, 3) the interaction between end-user 123 and another human being and the respective findings associated with the interactions (e.g., frustration with apps 113A-N and AI agents 125A-N) is incorporated into the cognitive profiles for the respective entities.

In another exemplary embodiment, AI module 107 can perform special tests to create the cognitive profile for AI agent 115 and AI agents 125A-N. The information derived from the special tests (i.e., special testing data) are incorporated into the cognitive profile for AI agent 115 and AI agents 125A-N. Some of the special tests used by AI module 107 include: (i) obtained sensor data (e.g., facial expression recognition, voice recognition, gait, and gestures); (ii) obtained data from text or speech recognition in order to select words used by AI agent 115 and AI agents 125A-N; and (iii) obtained data from AI agent 115, AI agents 125A-N, end-user 123, and human beings 130A-N, based on answers to a set of predefined questions in order to extract a plurality of mood categories. For each mood category, the answers correspond to the set of predefined questions. In this embodiment, AI module 107 can discern from the set of predefined questions that certain words have different connotations and thus, correspond to different moods. In a first example, AI agent 115 tells AI agents 125A-N through a messenger service that AI agent 115 is "slightly disappointed" with AI agents 125A-N. In a second example, AI agent 115 tells AI agents 125A-N through a messenger service that AI agent is "furious" with AI agents 125A-N. Both "slightly disappointed" and "furious" are representative of words/terms with negative connotations (i.e., negative sentiment). However, "furious" has far more negative sentiment than "disappointed" (i.e., a higher level of negative sentiment.) Thus, AI module 107 concludes that a scenario resembling the first example would lead to a better mood for AI agent 115 than a scenario resembling the second example by virtue of the first example corresponding to less negative sentiment than the second example.

In step 210, AI module 107 analyzes the cognitive profile(s) of the (one or more) entities (within data processing environment 100). As noted above, each of the one or more entities are either an individual (e.g., end-user 123 and human beings 130A-N) or an AI agent (e.g., AI agent 115 and AI agents 125A-N). In this exemplary embodiment, the cognitive profile(s) are obtained from step 205, wherein each cognitive profile corresponds to a single entity within the environment of interest to AI module 107. In this embodiment, AI module 107 analyzes the cognitive profiles by identifying and classifying these interactions within the respective cognitive profile to generate a "multi-way interaction profiles" which contains extracted data by examining the interactions among discrete entities.

AI module 107 treats each discrete entity, whether an individual (e.g., end-user 123 and human beings 130A-N) or an AI agent (e.g., AI agent 115 and AI agents 125A-N), as a data object to be stored and analyzed on computing device 105. AI module 107 maps all of the interactions of each data object using data links. Each data link represents the interaction between two discrete entities. The discrete data objects and the connecting data links are incorporated into the multi-way interaction profile.

In instances where two discrete entities interact with one another, then a data link between the two discrete entities exists. In instances where two discrete entities do not interact with each other, then a data link between the two discrete entities does not exist. The data objects and data links are discussed in more detail with respect to FIG. 3.

AI module 107 further analyzes the cognitive profile by creating a relationship model within the cognitive profile. In this embodiment, AI module 107 forms a relationship model over a period of time in order to describe how data objects interact with each other when two or more data objects are connected by a data link. The data link is analyzed in order to yield the relationship model. Using the example above, end-user 123 using the online brokerage for stock trading is one discrete data object and a customer service assisting unit among AI Agents 125A-N is another discrete data object. These two discrete data objects interact with each other and are connected to each other by a data link. The data link is analyzed to construct the relationship model, which is further processed by AI module 107 to yield a relationship profile.

In step 215, AI module 107 determines whether a relationship model is created between two or more entities (within data processing environment 100). As mentioned before, an "entity" as used herein, refers to an AI agent, user using a computing device, or any number of combination of AI agents and users (e.g., individuals such as end-user 123 and human beings 130A-N and AI agents such as AI agent 115 and AI agents 125A-N). In this embodiment, AI module 107 determines whether a relationship model is created between two or more entities by searching through the cognitive profiles and identifying, for a relationship model, that a data link between two or more entities exists.

If, in step 215, AI module 107 determines that a relationship model between two or more entities exist, then, in step 220, AI module 107 uses relationship models to implement multiple application action operations. In an exemplary embodiment, AI module 107 implements multiple actions by transmitting a set of instructions to apps 113A-N. For illustrative purposes, apps 113A-N are hosted on computing device 105. However, it should be understood that apps 113A-N can be any app hosted on any number of computing devices that have one or more separate functions transmitting these multiple applications which are represented as apps 113A-N within computing device 105. As mentioned previously, an "action operation" as used herein, refers to one or more operations that can be performed to affect an end user. For example, an action can include suggestions (e.g., strategies to approach a specific end user, colors to wear to calm an end user, etc.). An action can also include a set of transmitted instructions (e.g., deploying mood enhancing robots) or any other process that performs with the desired function to achieve ameliorating an interaction (e.g., ordering flowers for an end user based on the end user's cognitive profile and received contextual information).

Using the example above which describes the interaction of an end-user using the online brokerage for stock trading, AI module 107 can identify end-user 123 using the online brokerage for stock trading as one discrete data object and a customer service assisting unit among AI Agents 125A-N as another discrete data object that are connected to each other by the data link. AI module 107 can utilize the relationship model in the cognitive profile for end-user 123 to identify that between end-user 123 does not prefer to interact with AI agents in the context of stock trading. Accordingly, AI module 107 can deploy an action operation that re-routes communications from AI agents to a human being for the end user. Thus, when end-user 123 uses apps 113A-N, human beings 130A-N provide end-user 123 with customer service help because end-user 123 prefers working with an individual as opposed to AI agents. Thus, constructed cognitive profile which contains the relationship models and the accompanying relationship profiles can be used by AI module 107 to assist individuals and AI agents in order to enhance the quality of conversations between individuals and AI agents by taking into account how different entities interact.

In contrast, if, in step 215 AI module 107 determines that a relationship model between two or more entities does not exist, then a relationship model has not been created corresponding to those two or more entities and processing continues at step 205.

Figure 3:
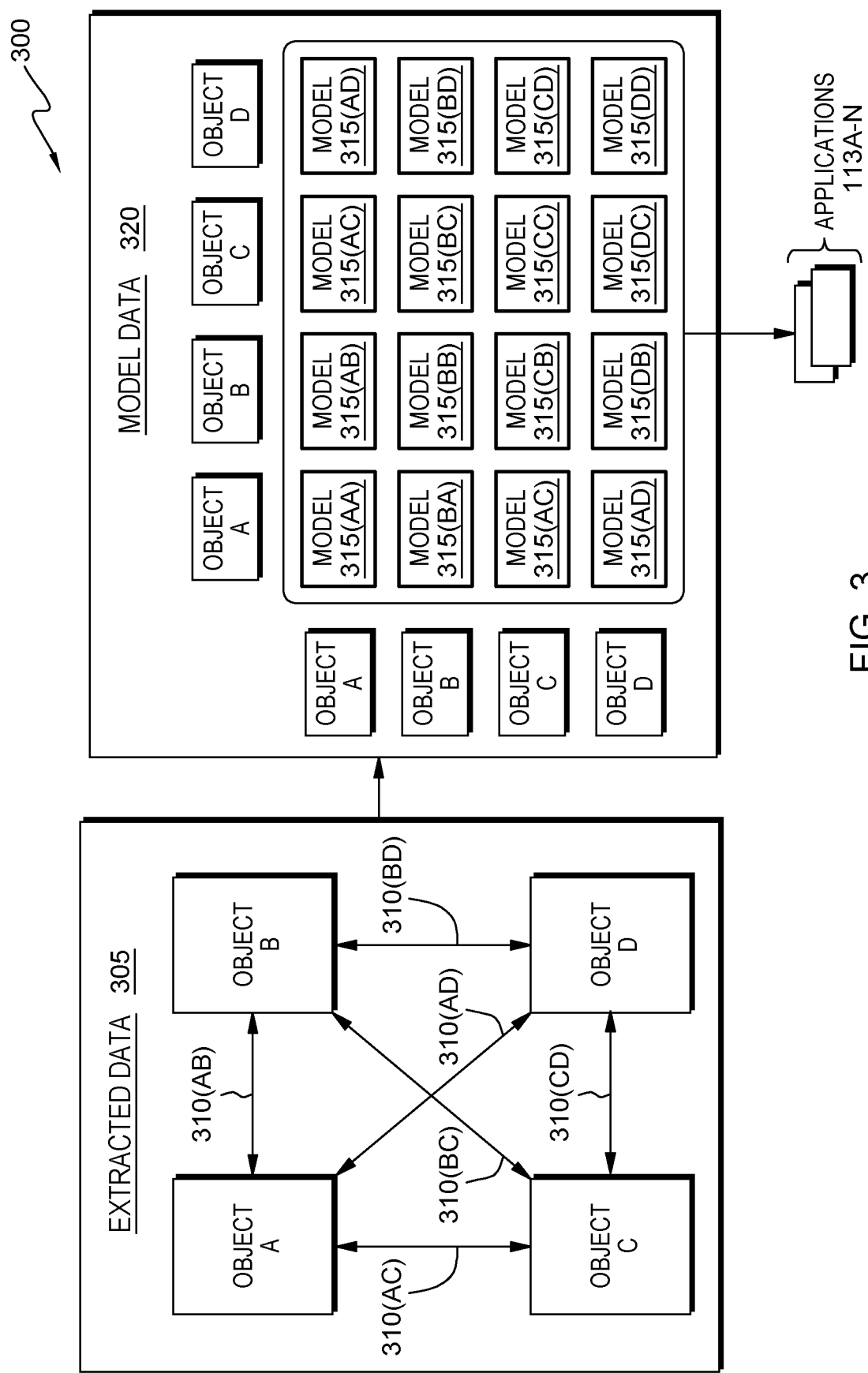
FIG. 3 is a block diagram of extracted data and model data deriving from the analyzed data, in accordance with an embodiment of the present invention.

FIG. 3 is a block diagram of extracted data and model data deriving from the analyzed data, in accordance with an embodiment of the present invention.

Data 300 is data subsequent to analyzing interactions among different entities—individuals (e.g., end-user 123 and human beings 130A-N) and AI agents (e.g., AI agent 115 and AI agents 125A-N).

The notation "link 310(XY)" represents the data link between discrete data object X and discrete data object Y, while "link 310" represents a single, generic unit of a data link. The notation "model 315(XY)" represents the relationship model between discrete data object X and discrete data object Y, while "model 315" represents a single, generic unit of a relationship model. In this example, data object X and data object Y may be object A, object B, object C, or object D.

Extracted data 305 represents a multi-way interaction pathway containing four discrete data objects—object A, object B, object C, and object D. In an exemplary embodiment, object A and object B are individual-type entities (as opposed to AI agents) while object C and object D are AI agent-type entities (as opposed to individual-type entities). The data links between object A, object B, object C, and object D are represented by link 310(AB); link 310(BD); link 310(CD); link 310(AC); link 310(AD); and link 310 (BC). These data links treat the discrete data objects as nodes connected by edges using a graph data structure. A weighted graph is based on relationship status. For different features of the relationship between two discrete objects (e.g., positive feelings, negative feelings, anger, sadness, cordialness, etc.), a unique weight is added in the connecting edges between two discrete objects. The unique weight is used in part to define the relationship model described above (e.g., model 315).

In some embodiments, AI module 107 associates certain actions with a positive sentiment and other actions with a negative sentiment based on pre-configured settings. In an embodiment of the present invention, AI module 107 can identify sentiments based on biometric readings. For example, AI module 107 can utilize facial recognition software and measure a degree to which an individual's facial expression changes. More specifically, AI module 107 can utilize facial recognition software to measure frown lines on an individual's face as a way of measuring a negative sentiment.

In another embodiment, AI module 107 can identify sentiments based on graphic icons and text associated with the graphic icons. For example, smiling emoticons carry a positive connotation. When object A sends smiling emoticons to object B, AI module 107 concludes that there is positive sentiment in the interactions between object A and object B. In another example, angry emoticons or frowning when an individual is becoming upset. AI module 107 notices the individual is frowning when processing biometric data carry a negative connotation. Thus, angry emoticons and frowning are associated with a negative sentiment. When object A sends angry emoticons to object B, AI module 107 concludes that there is negative sentiment in the interactions between object A and object B.

The amount of positive sentiments and negative sentiments can be quantified when AI module 107 identifies positive sentiments and negative sentiments. In this embodiment, a numerical weighting scale is used in the unique weights, where lower numbers represent lesser weights and higher numbers represent greater weights. In other embodiments, any desirable weighting scale can be used. The sentiment may be of positive sentiment or negative sentiment. For example, when object A interacts with object B, there is constant confrontation between those two discrete data objects. The confrontation between object A and object B involves angry emoticons sent between the two discrete data object followed by messages that respectfully yet sternly criticize each other. Clearly, there are intense negative sentiments in these interactions. In this example, there is a numerical scale from 0 to 10, where 0 is associated with no sentiment and 10 is associated with the most intense amount of sentiment. Thus, AI module 107 associates the intense negative sentiments in the interactions in the example above with a "8" on the numerical scale.

In some embodiments, the unique weight corresponds to the degree of negative and positive sentiments during interactions, as depicted in the data link between two discrete data objects. For example, object A reacts very angrily (i.e., exhibiting negative sentiment) yet frequently with object B while object A barely interacts with object C. Even though there is much negative sentiment between object A and object B, the unique weight between object A and object B would indicate there is a stronger "connection" between object A and object B than the connection between object A and object C. This is due to the more frequent interactions that take place between object A and object B in comparison to the interactions that take place between object B and object C.

Link 310(AB) is a data link between object A and object B. Link 310(BD) is a data link between object B and object D. Link 310(CD) is a data link between object C and object D. Link 310(AC) is a data link between object A and object C. Link 310(AD) is a data link between object A and object D. Link (BC) is a data link between object B and object C. In an exemplary embodiment, extracted data 305 is used to generate model data 320, wherein model data 320 represents the relationship models between two discrete objects. Model 315(AA) is a relationship model between object A and object A; model 315(AB) is a relationship model between object A and object B; model 315(AC) is a relationship model between object A and object C; model 315(AD) is a relationship model between object A and object D; model 315(BA) is a relationship model between object B and object A; model 315(BB) is a relationship model between object B and object B; model 315(BC) is a relationship model between object B and object C; model 315(BD) is a relationship model between object B and object D; model 315(CD) is a relationship model between object C and object D; model 315(AD) is a relationship model between object A and object D; model 315(DB) is a relationship model between object D and object B; model 315(DC) is a relationship model between object D and object C; and model 315(DD) is a relationship model between object D and object D. Model 315(AA), model 315(BB), model 315(CC), and model 315(DD) are relationship models that are not between two discrete data objects. The relationship models, which are boxed within model data 320, are used to run applications 113A-N (i.e., apps 113A-N).

Figure 4:
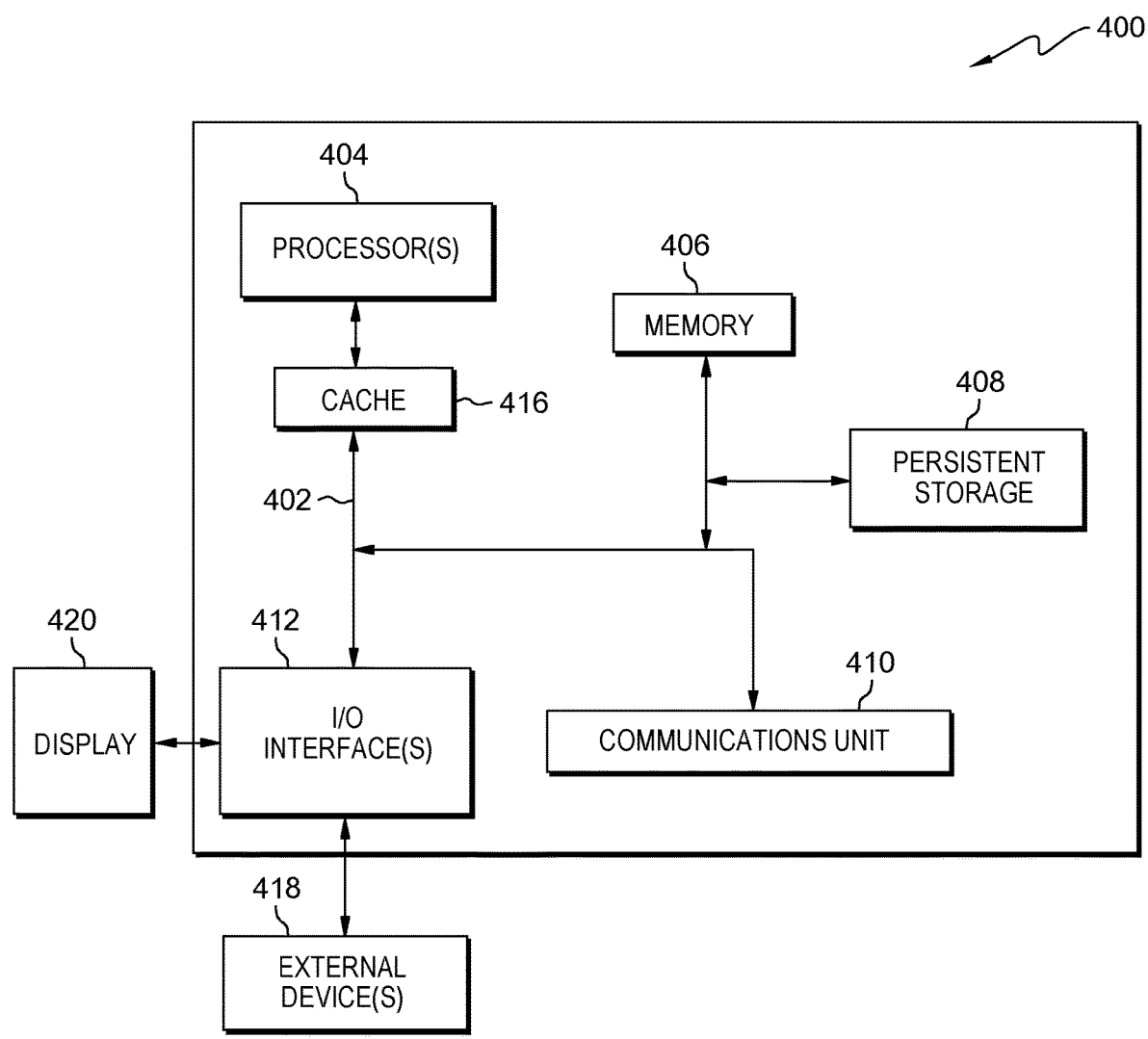
FIG. 4 depicts a block diagram of internal and external components of a computing device, in accordance with an embodiment of the present invention.

FIG. 4 depicts a block diagram of components of a computing device, generally designated 400, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Program instructions and data used to practice embodiments of the present invention may be stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising:
one or more non-transitory computer readable storage media and program instructions stored on the one or more non-transitory computer readable storage media, the program instructions comprising:
program instructions to observe interactions between a plurality of individuals and a plurality of artificial intelligence (AI) agents;
program instructions to create a cognitive profile for each respective individual of the plurality of individuals and each respective AI agent of the plurality of AI agents using social media data, observation protocols, and biometric data for the plurality of individuals and special testing data for the plurality of AI agents, wherein the observation protocols comprise monitoring conversation tone and facial expressions during a respective interaction, and wherein the special testing data comprises sensor data, text data, and speech recognition data obtained during a respective interaction;
program instructions to map a set of interactions to each cognitive profile for each respective individual and AI agent based on the observed interactions between the plurality of individuals and the plurality of AI agents, wherein each respective individual and AI agent is represented as a data object and each interaction is represented as a data link;
program instructions to generate a plurality of relationship models based on the mapped set of interactions, wherein each relationship model is associated with a single interaction within the mapped set of interactions;
program instructions to complete a mood analysis for each respective interaction, wherein the mood analysis for each respective interaction comprise:
program instructions to identify a level of positive sentiment and a level of negative sentiment,
program instructions to identify a behavioral trigger that lead to a change in behavior by either the individual or the AI agent, and
program instructions to interpret facial expressions of either the individual or the AI agent;
program instructions to update the cognitive profile for each respective individual of the plurality of individuals and each respective AI agent of the plurality of AI agents based on the plurality of relationship models and the mood analysis;
program instructions to generate an action operation for each respective individual and AI agent based on the cognitive profile for the respective individual and respective AI agent to ameliorate respective interactions between the plurality of individuals and plurality of AI agents; and
program instructions to implement the action operation for each respective individual and AI agent.

* * * * *